Jan. 23, 1962 R. H. PARK ET AL 3,017,834
MAGNETIC DETECTING DEVICE
Filed Aug. 28, 1943 6 Sheets-Sheet 4

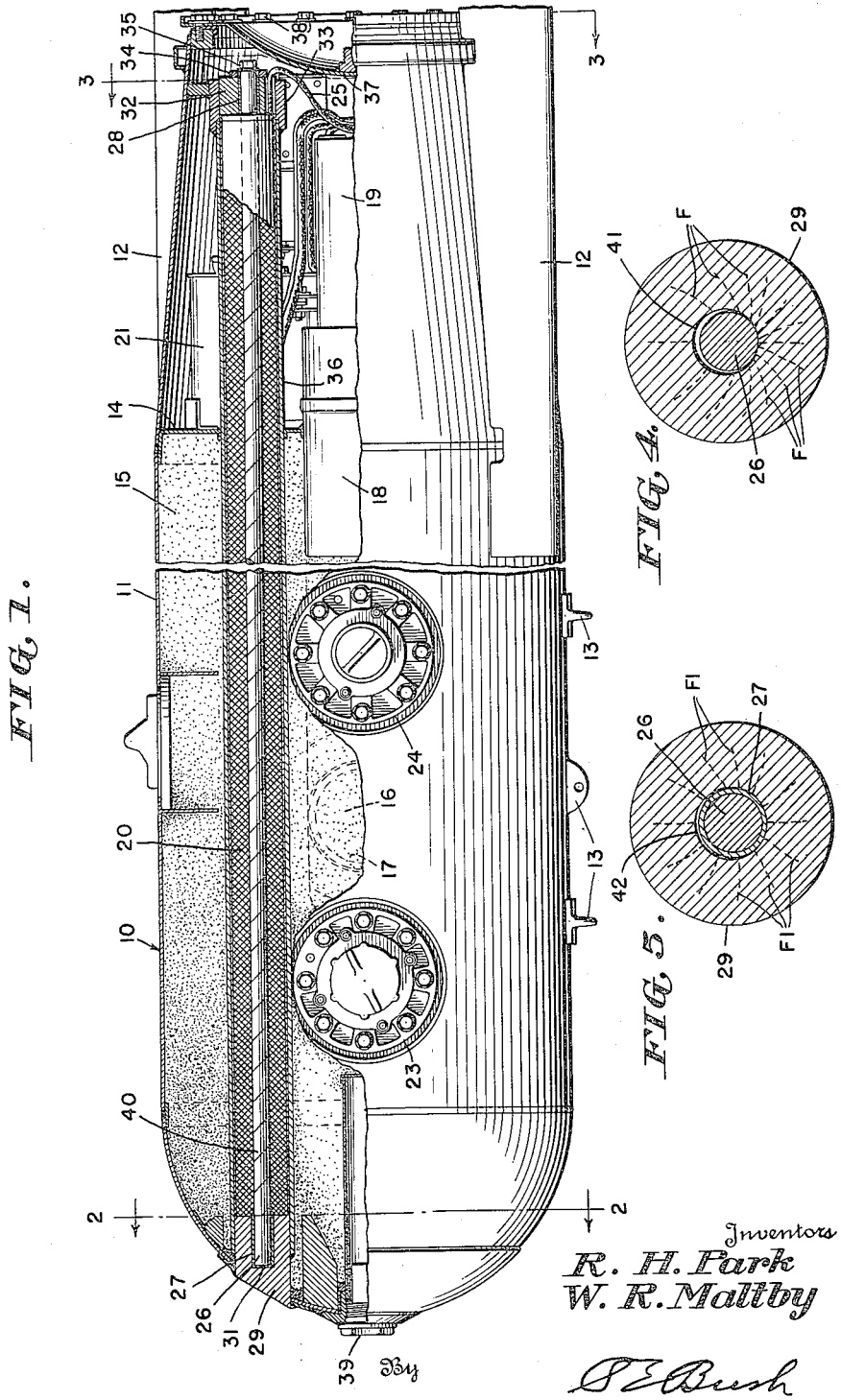

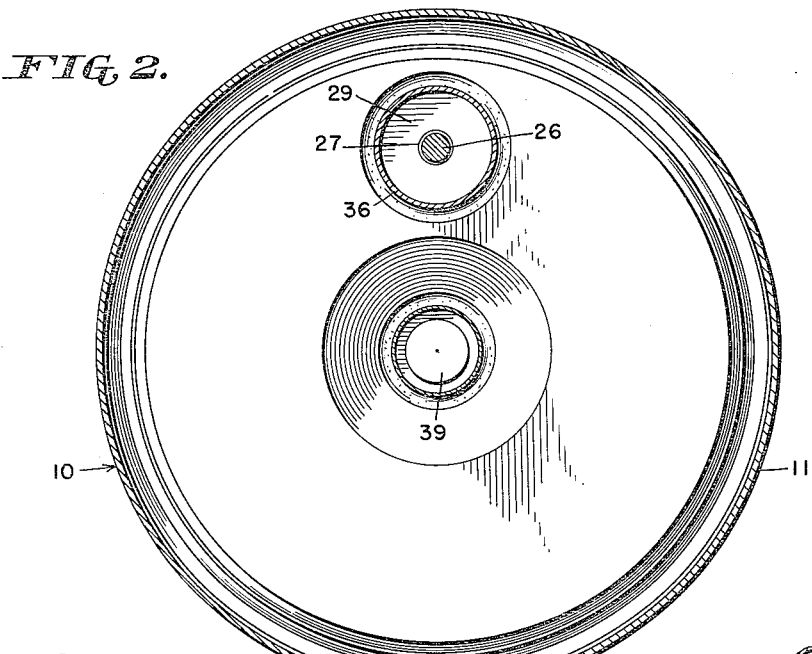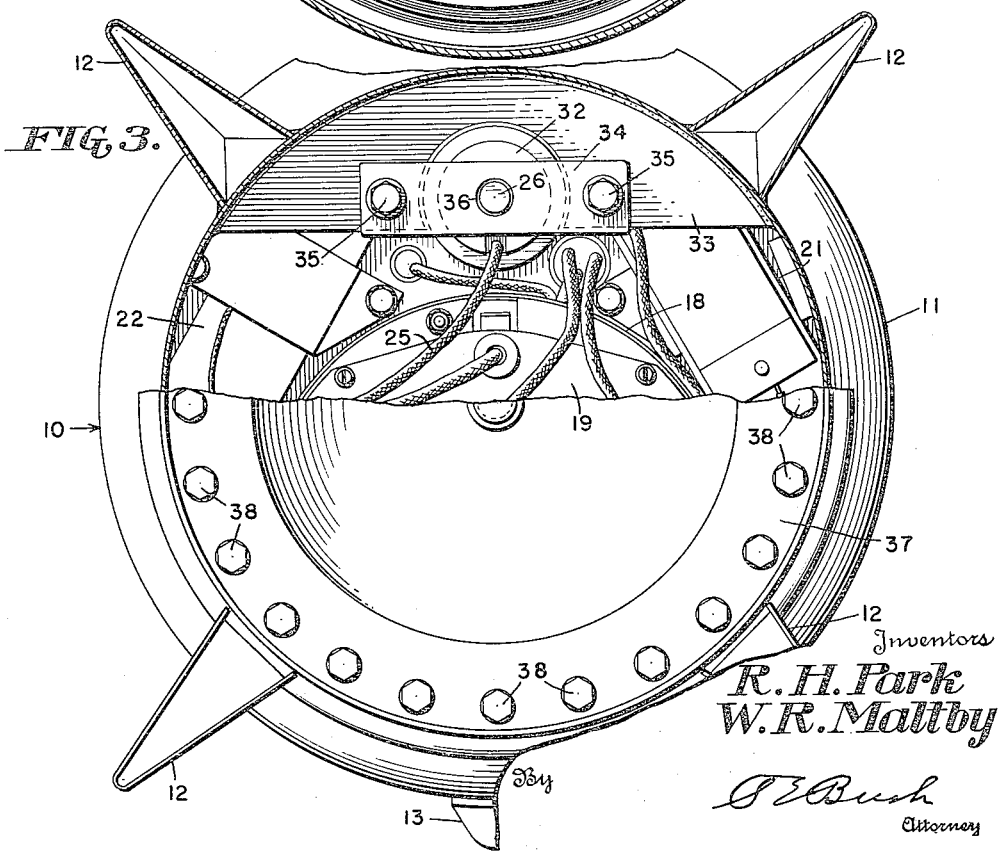

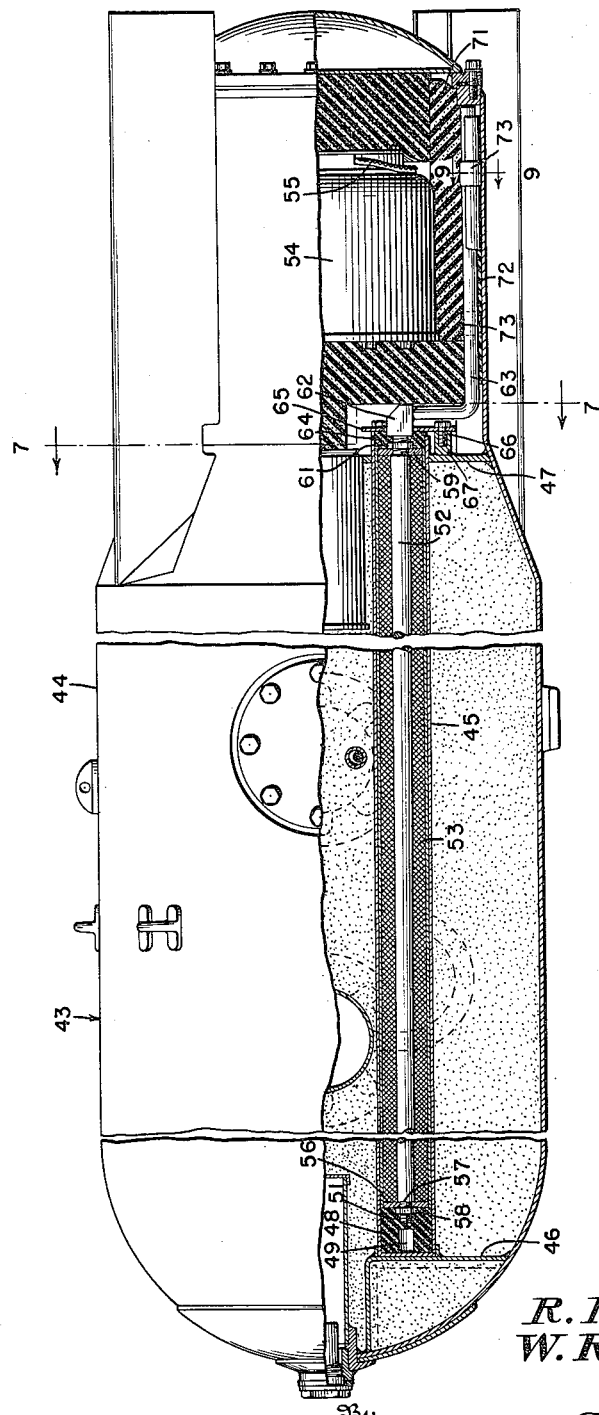

Inventors
R. H. Park
W. R. Maltby
By
F. E. Bush
Attorney

Inventors
R. H. Park
W. R. Maltby
By
P. E. Rush
Attorney

Inventors
R. H. Park
W. R. Maltby
By
P. E. Bush
Attorney

United States Patent Office 3,017,834
Patented Jan. 23, 1962

3,017,834
MAGNETIC DETECTING DEVICE
Robert H. Park, Pluckemin, N.J. (Corporation Road, Dennis, Mass.), and Wilson R. Maltby, Arlington County, Va. (9319 Cedar Lane, Bethesda, Md.)
Filed Aug. 28, 1943, Ser. No. 500,400
11 Claims. (Cl. 102—18)
(Granted under Title 35, U.S. Code (1952), sec. 266)

This invention relates to magnetic detectors and more particularly to devices of a magnetic type for detecting vessels or other magnetic bodies which are controlled by changes in the magnetic field acting thereon, these changes being due primarily to local disturbances caused by the movement of such magnetic bodies within the vicinity of the device.

It is well known in the art to which the present invention pertains that a coil of wire interlinking with a magnetic field, either the earth's magnetic field or a field provided by a simple magnet or electromagnetically, will have an electromotive force generated in it if the strength of the magnetic field interlinking the coil is varied, and furthermore if the coil encircles a bar or core of magnetic material the number of flux linkages of the coil will be increased for the reason that the core provides a better path or magnetic circuit than air for the magnetic field. Thus the passage of a vessel or other body containing a considerable amount of magnetic material close to such a coil disposed adjacent to the path of travel thereof will produce a magnetic disturbance and the magnetic field will be strengthened momentarily thereby generating a corresponding electromotive force within the coil. This electromotive force is of transient character in that it lasts only while the body of magnetic material is passing the coil so as to change the field strength, and is referred to herein as a wave or impulse.

It has been the practice heretofore in devices of this character for detecting the presence of magnetic bodies such, for example, as are used in certain types of mines and systems for vehicular traffic control, to provide within the coil a magnetic core or rod composed of iron or of a material of high permeability characteristics. Such cores or rods, when employed for this purpose, are usually of long and relatively slender proportions in which the diameter or cross section of the core is maintained substantially constant throughout the length of the rod. When a current actuated relay is used with the coil as an indicator of flux changes, the greatest sensitivity is obtained when the coil resistance is made substantially equal to the relay circuit resistance. For a coil of fixed resistance the flux linkages per turn of the coil decrease as the coil winding approaches the end of the coil and for this reason a more efficient coil structure is provided by a coil encircling only a fractional part of the length of the core.

In order that a considerable electromotive force of a magnetic induction coil may be realized in detecting changes in the earth's magnetic field, it has heretofore been necessary to provide the coil with a magnetic rod or core of very long and slender proportions. In cases where the coil is employed for the purpose of detecting changes in a magnetic field caused by a vessel thereby to control a firing device for a submarine mine, for example, the length of the core has heretofore been restricted to a fractional portion of the length of the mine casing and the sensitivity and range of detection of the coil is correspondingly reduced.

Furthermore in devices of this character heretofore proposed and possessing the high degree of sensitivity necessary to detect relatively small changes in the terrestrial magnetic field adjacent thereto it has been found that relative movement between the magnetic core and the supports therefor as the result of a shock or impulse of pressure received by the mine of insufficient strength to operate the anti-countermine device provided therein causes a variation in the reluctance of the magnetic circuit sufficient to operate the aforesaid relay and fire the mine by the electromotive force generated within the coil.

In the arrangement of the present invention the pickup power of the coil is increased by reason of the provision of a novel core structure and the premature firing of the mine as the result of a relatively weak shock or wave of pressure received through the surrounding water in response to relative movement between the core and the supports therefor is prevented.

One of the objects of the present invention resides in the provision of new and improved means for increasing the pickup power of an induction coil arranged within a mine.

Another of the objects is to provide means for preventing the firing of a submarine induction type mine by vibrations or pressure impulses of insufficient strength to operate the anti-countermine device therein.

Another of the objects is to provide a new and improved magnetic detection device in which the electromotive force generated by the coil as the result of relative movement between the core of the coil and the supports therefor is substantially reduced.

Another object is the provision of a new and improved magnetic conductor for increasing the flux gathering power of a rod.

Still other objects, advantages, and improvements will be apparent to those skilled in the art from a consideration of the following description taken in connection with the accompanying drawings wherein like numerals of reference are employed to designate like parts throughout the several views and in which:

FIG. 1 is a view partly in section and partly broken away of a mine employing the device of the present invention according to a preferred embodiment thereof;

FIG. 2 is a view somewhat enlarged taken along the line 2—2 of FIG. 1;

FIG. 3 is an enlarged view taken along the line 3—3 of FIG. 1;

FIG. 4 illustrates diagrammatically the magnetic coupling between the core and the support therefor when the present invention is not employed;

FIG. 5 illustrates diagrammatically the magnetic coupling between the core and the support when the arrangement of the present invention is employed;

FIG. 6 is a view of the mine partly in section and partly broken away employing the device of the present invention according to an alternative form thereof;

Figure 7:
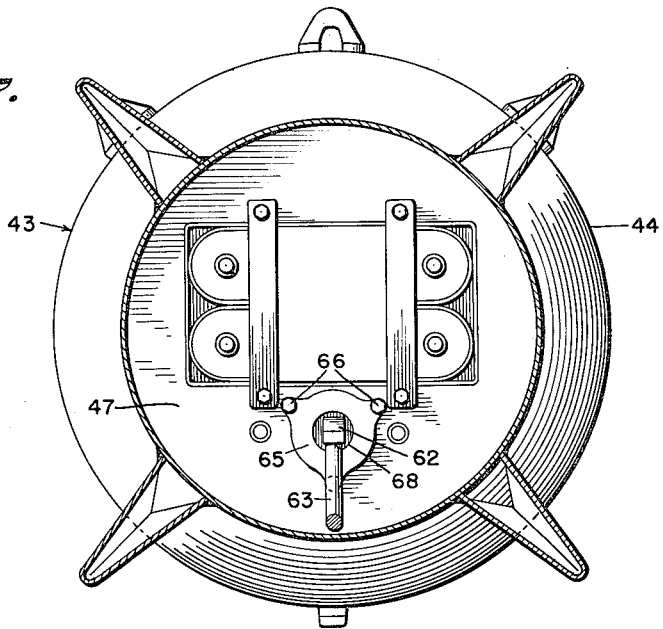
FIG. 7 is an enlarged view taken along the line 7—7 of FIG. 6.
Figure 8:
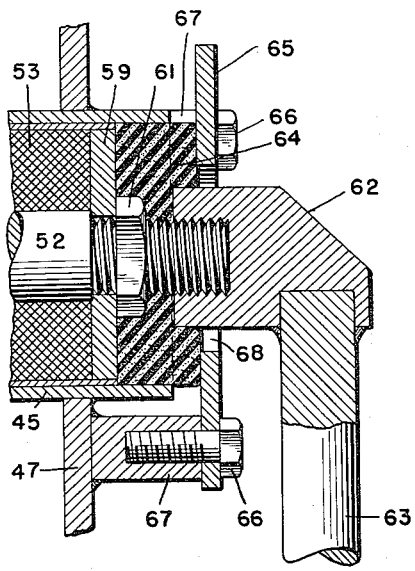
FIG. 8 is an enlarged view in section of a portion of the core of FIG. 6 and the supporting means therefor.
Figure 9:
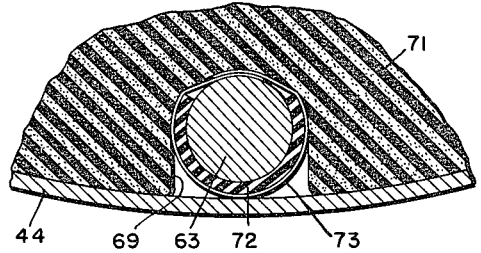
FIG. 9 is an enlarged sectional view taken along the line 9—9 of FIG. 6.

Referring now to the drawings for a more complete understanding of the invention and more particularly to FIG. 1 thereof, there is shown thereon a mine indicated generally by the numeral 10 comprising a casing 11 having a plurality of fins 12 thereon adapted to direct the mine along a predetermined path of travel when the mine is dropped from an aircraft in flight, the mine being secured to the aircraft prior to the launching thereof in any suitable manner as by certain well known releasable devices connected to the eyes 13. The mine is provided with a wall or partition 14 within the casing 11 thereby to form a chamber 15 within which is arranged an explosive charge. The casing is also provided with an aperture 16 through which the explosive charge is introduced within the casing, the aperture being thereafter sealed as by the cover 17.

There is also provided a chamber 18 within which is arranged a firing control mechanism adapted to fire the mine in response to a variation in the magnetic field adjacent thereto such, for example, as the firing control mechanism disclosed and claimed in the copending application of James B. Glennon et al. for Mine Firing Mechanism, Serial No. 406,236, filed August 9, 1941, now Patent No. 2,881,702. Within a chamber 19 is preferably provided certain relay and time delay mechanisms employed with the firing control mechanism. Secured to the partition 14 in any suitable manner is a pair of batteries 21 and 22 from which the electrical power is supplied for the operation of the mine firing control mechanism and the electroresponsive detonator controlled thereby. The detonator is arranged within a recessed portion 23 of the mine casing and adapted to be moved to an extended position in operating relation with respect to an explosive booster charge by the pressure of the surrounding water as is well known in the art to which the present invention relates.

There is also provided within a recessed portion 24 of the mine casing a hydrostatically controlled arming clock having a plurality of contact elements adapted to close a plurality of electrical circuits in time spaced relation and arm the mine when a predetermined period of time has elapsed after the mine has been planted. The firing mechanism is electrically connected as by the cable 25 to an induction coil 20 comprising a large number of turns of relatively fine wire wrapped about a core 26 of magnetic material and having a pair of sleeves or bushings 27 and 28 composed of nonmagnetic material suitable for the purpose such, for example, as brass and disposed about the end portions of the core and preferably secured thereto. The bushing 27 is arranged within a magnetic support 29 secured to the casing of the mine, a nonmagnetic washer 31 being arranged between the end of the core and the bottom of a cylindrical recessed portion within the support. The sleeve 28 is arranged within a magnetic bushing 32 slideably arranged within the magnetic support 33 secured to the casing of the mine in any suitable manner as by welding the parts together. By providing a pair of magnetic supports 29 and 33 arranged on opposite ends of the core 26 in the manner disclosed the sensitivity of the coil is increased by reason of the flux gathering power of the supports. A suitable clamping plate 34 secured to the support 33 as by the bolts 35 and having an aperture 36 therein of slightly larger diameter than the core 26 within which the core is disposed is provided to maintain the core and coil 20 in the assembled position within the mine. Endwise movement of the coil with respect to the core is prevented by reason of the provision of a wrapping or covering of material 40 suitable for the purpose such, for example, as acetate tape wrapped about the core and adapted to be engaged by the coil.

A cylindrical member 36 secured to the supports 29 and 33 encloses and protects the coil when the coil is in the assembled position within the mine. The trailing end of the mine is sealed by a cover or cap 37 secured thereto as by the bolts 38 and the leading end or nose of the mine is sealed preferably by a plug 39.

Referring now to FIG. 4 of the drawings there is shown thereon for the purpose of description a diagrammatic cross sectional view of the core 26 of an induction coil mounted in a conventional manner within the support 29 of FIG. 1 and composed of magnetic material. The support is provided with an aperture 41 within which the rod 26 is slideably arranged, the diameter of the rod being slightly less than the diameter of the aperture. The difference in the diameters of the aperture 41 and the rod 26 is shown slightly exaggerated on the sectional view of FIG. 4 thereby more clearly to illustrate the unequal distribution of the flux F engaging the rod 26 within the support 29 at that portion of the rod disposed within the aperture 41. In the arrangement illustrated on FIG. 4 the rod is shown in engagement with the support 29 at the lowermost portion of the aperture 41 therein and the flux density at the lower portion of the rod is much greater than the flux density at the upper portion of the rod, the total flux between the support and the core being considerably greater than the total flux between the support and the core when the core is moved to a position substantially coaxial with the aperture 41. From the foregoing it will be apparent that the pickup power or magnetic stability of the induction coil varies with changes in the reluctance of the magnetic circuit of the coil in proportion to variations in the instant position of the core with respect to the support or in proportion to the rate of change in the air gap between the core and the support.

On FIG. 5 is shown a view similar to FIG. 4 in which the core 26 provided with a sleeve or bushing 27 of nonmagnetic material preferably secured thereto in closely fitted relation and arranged within the bushing or support 29 of magnetic material having an aperture 42 therein. For the purpose of description it may be assumed that the difference between the outside diameter of the bushing 27 and the inside diameter of the support 29 is the same as the difference in diameter between the rod 26 and the aperture 41 within the support 29 of FIG. 4. Furthermore let it be assumed that the sleeve 27 is in engagement with the lower portion of the aperture 42. With the rod 26 in the position shown on FIG. 5 the magnetic flux F1 between the rod and the support 29 is unequally distributed within the aperture 42, the flux at the lower portion of the aperture being somewhat more dense than the flux at the upper portion of the aperture. The inequality of distribution of the flux F1 about the rod 26, however, is less than the inequality of distribution of the flux F in the arrangement of FIG. 4 by reason of the provision of the sleeve 27 of nonmagnetic material about the rod which maintains a minimum continuous magnetic gap of predetermined thickness between the core and the support regardless of the vibratory movement between the core and the support. The arrangement of FIG. 5, it will be noted, maintains at all times an effective air gap between the core and the support at least as great as the thickness of the bushing 27 and the total flux within the air gap of FIG. 5 remains more nearly uniform than the total flux within the air gap of FIG. 4 as the core 26 moves from a central position within the support to a position in which further movement of the rod is arrested by the support.

By providing an arrangement in which the core is prevented from being moved into contact with the support in the manner disclosed a considerable improvement in the magnetic stability of the induction pickup coil is effected whereby the mine is rendered insensitive to countermine shocks of insufficient strength to actuate the anticountermine mechanism of the mine but otherwise of sufficient strength to fire the mine by variations in the pickup power of the induction coil as a result of changes in the reluctance of the magnetic circuit of the pickup coil as the shocks are received. By providing means of arresting vibratory movement of the core before the core moves into engagement with the magnetic supports, the magnetic stability of the mine is increased.

On FIG. 6 is shown a mine 43 comprising a casing 44 generally similar to the casing of the mine 10 of FIG. 1. Disposed within the casing is a cylindrical member 45 supported at the ends thereof by the support 46 and the partition 47 respectively. There is arranged within the member 45 a cylindrical pad or cushion 48 of resilient material suitable for the purpose such, for example, as rubber or any of the synthetic varieties thereof preferably having a recessed portion 49 therein and a second recessed portion 51 adapted to receive and support one end of a magnetic core or rod 52 having a coil 53 thereon composed of a large number of turns of wire in electrical connection with the firing control mechanism 54 as by the cable 55 extending therebetween. The rod is provided with a washer or spool head 56 securely maintained against a shoulder 57 on the rod as by the nut 58 threaded thereon. In like manner the opposite end of the rod is provided with a shoulder against which the washer or spool head 59 is continuously maintained as by the nut 61. On the end of the rod 52 and secured thereto as by threading the parts together is a coupling member 62 having an L-shaped member 63 secured thereto in any suitable manner such as by welding the parts together. The members 62 and 63 are composed of magnetic material whereby the effective length of the core and the pickup power of the coil are substantially increased. The rod and member 62 are yieldably supported within the tubular member 45 by a resilient pad or cushion 64 arranged therebetween and maintained in the assembled position by the clamping plate 65 secured to the partition 47 as by the bolts 66, a plurality of projecting portions 67 secured to the plate or partition 47 being provided for this purpose. The clamping plate is provided with an aperture 68 of greater size than the coupling member 62 thereby to permit relative movement of the core with respect to the plate and provide a magnetic path of high reluctance between the core and the partition 47.

The L-shaped member 63 is arranged at the longitudinal portion thereof within a recessed portion 69 of a flexible pad or cushion 71 adapted to support the mine firing control mechanism yieldably within the casing 44 and thereby prevent damage or injury to the mine firing control mechanism during the assembly, transportation and planting of the mine. The magnetic member 63 is prevented from being brought into contact with the casing of the mine by a strip of insulating material 72 wrapped partially about the member 63 and secured thereto as by the bands or strips of tape 73. An arrangement is thus provided in which the length of the magnetic rod or core is effectively increased and the pickup power of the coil 53 and sensitivity of the coil are correspondingly increased.

Figure 10:
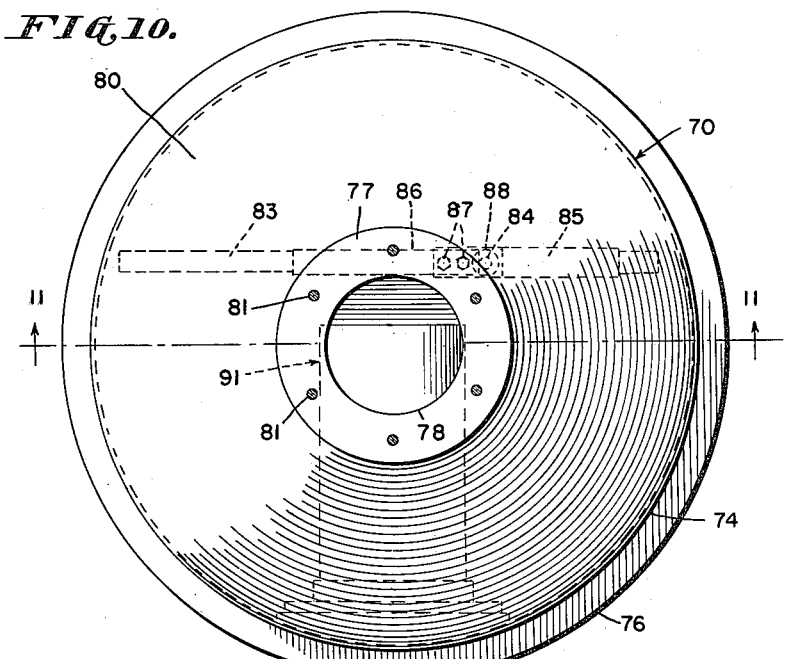
FIG. 10 is a plan view of another type of mine employing the device of the present invention in accordance with still another modification thereof.
Figure 11:
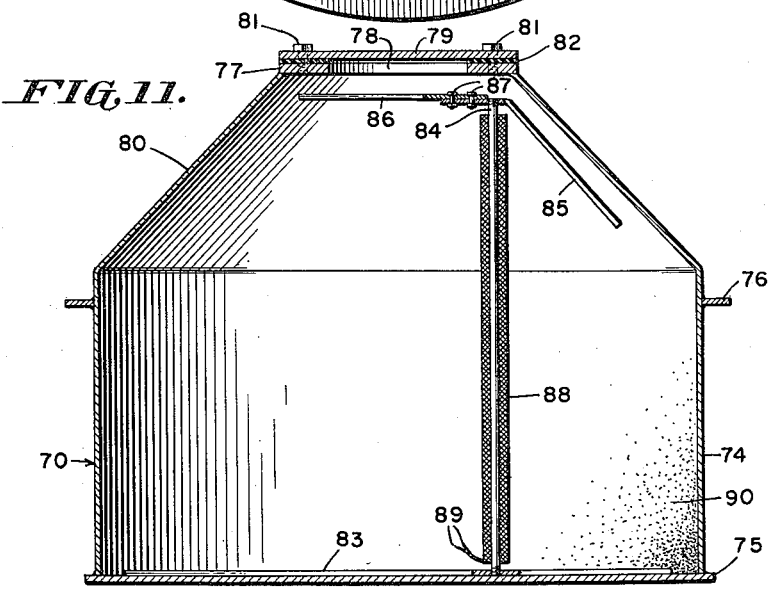
FIG. 11 is a view in section taken along the line 11—11 of FIG. 10.

On FIGS. 10 and 11 is shown in plan and elevation respectively another type of mine, indicated generally by the numeral 70, employing the arrangement of the present invention in accordance with an alternative form thereof, the mine comprising a casing 74 composed preferably of nonmagnetic material suitable for the purpose such, for example, as manganese steel or the like, preferably circular in shape and secured to a base 75 in any well-known manner, such for example, as by welding the parts together. The casing as illustrated comprises a conical portion 80 and is provided with an annular reinforcing rib 76 arranged exteriorly thereon and adapted to strengthen and support the casing. There is also secured to the upper portion of the conical section of the casing a plate 77 having an aperture 78 therein adapted to be sealed by a cover 79 secured to the plate as by the bolts 81, a gasket 82 being arranged between the cover and the plate to insure a watertight connection therebetween.

Secured to the base 75 in any suitable manner is a mounting strip or bar 83 composed of magnetic material adapted to support one end of a magnetic rod or core 84 secured thereto in closely coupled magnetic relation as by threading the parts together. The other end of the rod 84 is secured to a support 85 secured in any suitable manner to the casing of the mine and having a laterally extending flux gathering member 86 secured thereto as by the bolts 87. The support 85 and member 86 are arranged in the same vertical plane as the bar 83 and are composed of magnetic material thereby to increase the pickup power and sensitivity of the coil 88 arranged about the rod 84. The coil 88 is composed of a large number of turns of relatively fine wire and provided with a pair of conductors 89 for establishing an external electrical conection to the coil. The base 75 and plate 77 are preferably composed of magnetic material. By providing a structure in which the core 84 is magnetically coupled to the bar 83 and to the support 85 including the member 86, the flux collecting power of the coil is increased by reason of the magnetic coupling between the bar 83 and the base 75 and the magnetic coupling between the support 86 and the plate 77 disposed adjacent thereto. The mine 70 is provided with any well-known type of firing mechanism indicated generally by the numeral 91 adapted to be controlled by signals received from the pickup coil 88 is response to a change of the magnetic field adjacent thereto and to fire an explosive charge 90 disposed within the casing 74 when the change in the magnetic field has reached a predetermined proportion.

Figure 12:
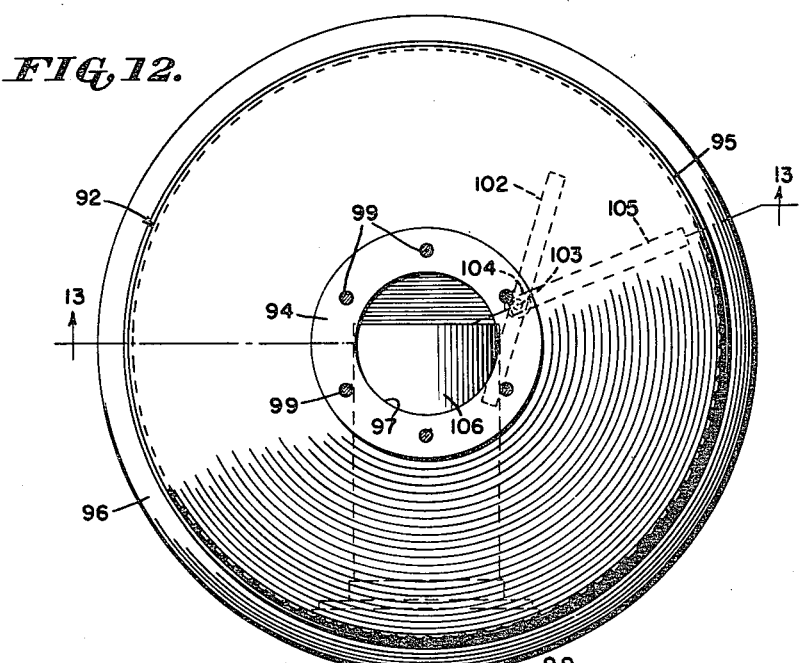
FIG. 12 shows a mine similar to the mine of FIG. 10 provided with an alternative form of the invention; and, FIG. 13 is a view taken along the line 13—13 of FIG. 12.
Figure 13:
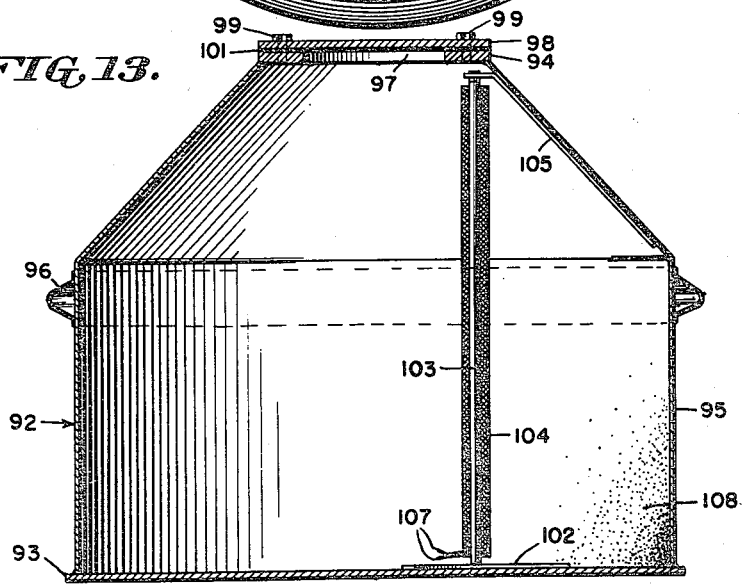

On FIGS. 12 and 13 is shown a mine indicated by the numeral 92 and generally similar to the mine 70 of FIGS. 10 and 11 comprising a base 93 and an upper plate 94 of magnetic material secured to a casing 95 of nonmagnetic material at the upper conical portion thereof. The casing is preferably exteriorly reinforced as by the annular member 96 secured thereto.

The plate 94 is provided with an aperture 97 of sufficient size to permit the introduction of an explosive therein, the aperture being sealed by a cover 98 secured to the plate as by the bolts 99 in sealed relation therewith by reason of a gasket 101 arranged therebetween.

Secured to the base 93 is a magnetic plate or bar 102 to which is secured, as by threading the parts together, one end of the magnetic rod or core 103 having an induction pickup coil 104 arranged thereon. The opposite end of the core 103 is supported by a magnetic bar or rod 105 secured thereto in closely coupled magnetic relation and supported by the casing 95, in such a manner that the bars 102 and 105 are arranged in different vertical planes intersecting the axis of the core 103. By supporting the core 103 of the pickup coil 104 by the members 102 and 105 in the manner illustrated, the structure comprises a magnetic antenna arrangement possessing substantially improved flux collecting properties adapted to respond to the vertical component of the external magnetic field and to increase the flux collecting power of the core by reason of the flux collecting devices illustrated. The pickup coil, therefore, is adapted to generate a signal of sufficient strength to operate the mine firing control mechanism indicated generally by the numeral 106 connected thereto as by the conductors 107 in response to a relatively small change in the magnetic field adjacent the mine and thereby fire an explosive charge 108 disposed within the mine.

Briefly stated in summary, the present invention contemplates the provision of new and improved means for increasing the pickup power of an induction coil disposed within a mine in which the axial length of the magnetic core arranged within the coil is necessarily limited by the physical dimensions of the mine casing. Furthermore, the present invention discloses a novel arrangement of the magnetic circuit of a search or induction pickup coil in which spurious voltages generated by the coil as a result of vibration or shock received by the mine are substantially reduced.

While the invention has been described with reference to several examples thereof which give satisfactory results, it will be understood by those skilled in the art, after understanding the invention, that various changes and modifications may be made without departing from the spirit and scope of the invention and it is my intention, therefore, in the appended claims to cover all such changes and modifications.

The invention herein described and claimed may be manufactured and used by or for the Government of the United States of America for governmental purposes without the payment of any royalties thereon or therefor.

What is claimed as new and desired to be secured by Letters Patent of the United States is:

1. In a magnetic mine having a sensing device for detecting the movement of a vessel containing magnetic material in a magnetic field, the combination of a mine casing, an explosive charge within said casing, a firing control mechanism for firing said charge, a search coil having ends for external electrical connection, a core of magnetic material disposed within said coil, means including a pair of non-magnetic resilient pads in engagement with said casing for supporting the core at the ends thereof an L-shaped bar of magnetic material connected to one end only of said core in substantial abutting relation with said coil for increasing the effective length of the core and the coupling between the coil and said magnetic field, and an electrical connecting means connecting said search coil to said firing control mechanism.

2. A magnetic mine assembly of the character disclosed comprising a casing, a search coil adapted to generate electrical impulses in response to changes in the magnetic field, a bar of magnetic material disposed within said coil for increasing the number of flux linkages with the coil, and a plurality of antennae members of magnetic material extending outwardly from the ends of said bar for increasing the degree of response of the coil to said changes in the magnetic field, said antennae being fixedly secured to the interior walls of said casing.

3. In a mine, in combination, a casing for said mine, a magnetic detector comprising a bar of magnetic material adapted to concentrate a magnetic field adjacent thereto, a pair of supports of magnetic material adapted to support the bar within the casing and to increase the concentration of flux within said bar, a coil encircling said bar and adapted to generate an impulse of electromotive force in response to a variation in the concentration of the flux within the bar, means operatively connected to said coil for firing the mine in response to a predetermined impulse of electromotive force generated by said coil, and means including a pair of devices of nonmagnetic material respectively arranged about the end portions of said bar intermediate the bar and said supports for preventing the coil from generating an electromotive force sufficient to fire the mine by relative movement of the bar with respect to said supports.

4. In a search coil of the character disclosed arranged within a magnetic field and adapted to generate electrical impulses in response to changes in the magnetic field, a core of magnetic material disposed within said coil for increasing the number of flux linkages with the coil, a pair of supports of magnetic material having apertures therein within which the ends of the core are slideably disposed thereby additionally to increase the flux linkages with said coil, and a pair of bushings of nonmagnetic material arranged within said apertures and connected to said core for reducing the electromotive force generated by said coil in response to relative movement of the core with respect to said supports.

5. A linear bar of magnetic material arranged within a casing disposed within a magnetic field, a pair of sleeves of non-magnetic material secured around each end respectively of said bar in close fitting relation thereto, a search coil arranged about said bar and adapted to generate electrical impulses in response to changes in the magnetic field within the bar, a pair of supports mounted upon the interior walls of said casing and composed of magnetic material having recessed portions within which the end portions of the bar and said sleeves are respectively arranged, said magnetic supports being adapted to increase the concentration of flux within the bar, and mine firing mechanism electrically connected to said search coil and adapted to be controlled by electrical impulses received from said search coil as the flux linkages with the coil are varied.

6. In a mine arranged within a magnetic field, in combination, a mine casing having a circular portion of nonmagnetic material and upper and lower portions of magnetic material, a magnetic bar, a search coil disposed about said bar and adapted to generate waves of electromotive force in accordance with variations in the magnetic field within the bar, means secured to one end of the bar for increasing the magnetic coupling between the bar and the lower portion of said casing, means secured to the other end of the bar in juxtaposition with the upper portion of the casing for additionally increasing the concentration of the magnetic field within the bar.

7. In a mine arranged within a magnetic field, in combination, a mine casing having a cylindrical portion of nonmagnetic material and upper and lower portions of magnetic material, a linear magnetic bar arranged within said casing parallel to the axis of said cylindrical portion, a search coil disposed about said bar and adapted to generate waves of electromotive force in accordance with variations in the magnetic field within the bar, means secured to one end of the bar for increasing the magnetic coupling between the bar and the lower portion of said casing, means secured to the other end of the bar in juxtaposition with the upper portion of the casing for additionally increasing the concentration of the magnetic field within the bar.

8. In a search coil of the character disclosed arranged within a magnetic field and adapted to generate electrical impulses in response to changes in said field, a bar of magnetic material disposed within said coil for concentrating a portion of said field within the coil, a pair of supports of magnetic material capacitively coupled to the ends of said bar for increasing the degree of concentration of magnetic flux within the bar, and a pair of devices of nonmagnetic material respectively connected to each of the ends of said bar for maintaining the bar in continuous closely spaced relation with respect to said pair of supports and adapted to prevent the bar from being brought into contact with the supports as the result of a shock received thereby.

9. A magnetic mine of the character disclosed comprising a casing, a mine firing mechanism, an elongated cylindrical magnetic core element, a tubular shaped search coil, and means for mounting said core element within said casing, said mounting means having at least a portion thereof composed of magnetic material and a cavity therein for supporting one end of said elongated core element in tight fitting engagement therewith thereby to prevent the generation of electrical impulses by the coil sufficient to operate said mine firing mechanism in response to a variation in the flux linkages of said coil caused by relative movement between said mounting means and said core element.

10. In a magnetic sensing device for a mine of the character disclosed comprising a casing, an elongated element of magnetic material, a plurality of mounting means for said element and having at least a portion thereof composed of magnetic material and secured to said casing, at least one of said mounting means having a cavity to accommodate an end of said elongated element in a tight fitting relation therewith, a sensing coil disposed about a portion of said elongated element inwardly from each end thereof, and means operatively connected to said coil for firing the mine in response to a predetermined impulse of electromotive force generated by said coil.

11. A claim according to claim 1 in which the L-shaped bar is disposed parallel and in close spaced adjacency to said casing, and a wrapping composed of insulating material about the bar to prevent contact between the bar and said casing as the result of an anti-countermine shock received by the mine.

References Cited in the file of this patent

UNITED STATES PATENTS

| | | | |
|---|---|---|---|
| 542,732 | Huskisson | July 16, | 1895 |
| 1,275,292 | Neuland | Aug. 13, | 1918 |
| 1,442,512 | Andreino | Jan. 16, | 1923 |
| 1,961,782 | Rich | June 5, | 1934 |
| 2,016,977 | Thomas | Oct. 8, | 1935 |
| 2,123,045 | Hoare | July 5, | 1938 |
| 2,252,059 | Barth | Aug. 12, | 1941 |
| 2,400,549 | Glennon et al. | May 21, | 1946 |
| 2,418,553 | Irwin | Apr. 8, | 1947 |

FOREIGN PATENTS

| | | | |
|---|---|---|---|
| 803,907 | France | July 20, | 1936 |